United States Patent [19]

Aggers et al.

[11] Patent Number: 4,949,337
[45] Date of Patent: Aug. 14, 1990

[54] TOKEN PASSING COMMUNICATION NETWORK INCLUDING A NODE WHICH MAINTAINS AND TRANSMITS A LIST SPECIFYING THE ORDER IN WHICH THE TOKEN IS PASSED

[75] Inventors: John R. Aggers, Apple Valley; Roger R. Roth, Minnetonka, both of Minn.

[73] Assignee: Honeywell Inc., Minneapolis, Minn.

[21] Appl. No.: 303,427

[22] Filed: Jan. 30, 1989

[51] Int. Cl.⁵ ............................ H04J 3/02; H04J 3/16
[52] U.S. Cl. .................................. 370/85.4; 370/85.2
[58] Field of Search ................... 370/85.1, 85.2, 85.4, 370/85.5, 85.15, 94.1, 85.13, 85.14, 85.12, 85.9, 85.7, 95.1; 340/825.5, 825.05, 825.51

[56] References Cited

U.S. PATENT DOCUMENTS

| Re. 31,852 | 3/1985 | Soderblom | 370/85.15 |
|---|---|---|---|
| 4,287,592 | 9/1981 | Paulish et al. | 370/85.14 |
| 4,456,957 | 6/1984 | Schieltz | 364/200 |
| 4,491,946 | 1/1985 | Kryskow, Jr. et al. | 370/85.4 |
| 4,506,360 | 3/1985 | Kryskow, Jr. et al. | 370/85.4 |
| 4,511,958 | 4/1985 | Funk | 364/200 |
| 4,566,097 | 1/1986 | Bederman | 370/85.5 |
| 4,583,088 | 4/1986 | Bux et al. | 370/85.4 |
| 4,661,952 | 4/1987 | von Sichart et al. | 370/85.4 |
| 4,663,748 | 5/1987 | Karbowiak et al. | 370/85.4 |
| 4,674,086 | 6/1987 | Szczepanek et al. | 370/85.5 |
| 4,689,786 | 8/1987 | Sidhu et al. | 370/85.1 |

Primary Examiner—Douglas W. Olms
Assistant Examiner—Wellington Chin
Attorney, Agent, or Firm—Edward Schwarz

[57] ABSTRACT

A communication network has one master node which maintains an active master list (AML) containing the node addresses of all nodes to which the token will be passed. When nodes are added or deleted from the network, it is efficient in terms of data bus occupancy and individual processing time by the nodes if the successor address for each node is broadcast in a single message, and the availability of an AML makes this possible. The network has the capability of efficiently updating the AML whenever the configuration of the network is so changed.

9 Claims, 2 Drawing Sheets

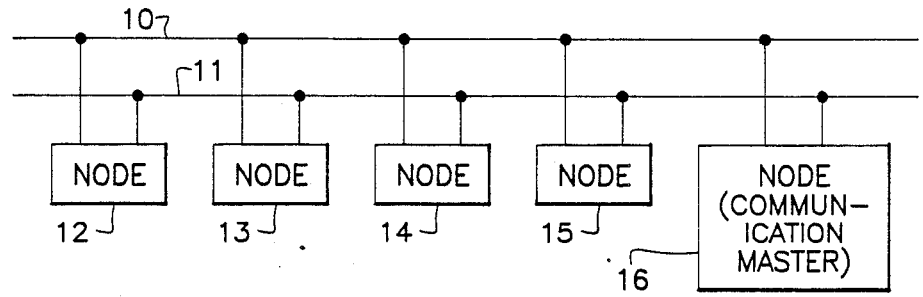
Fig. 1
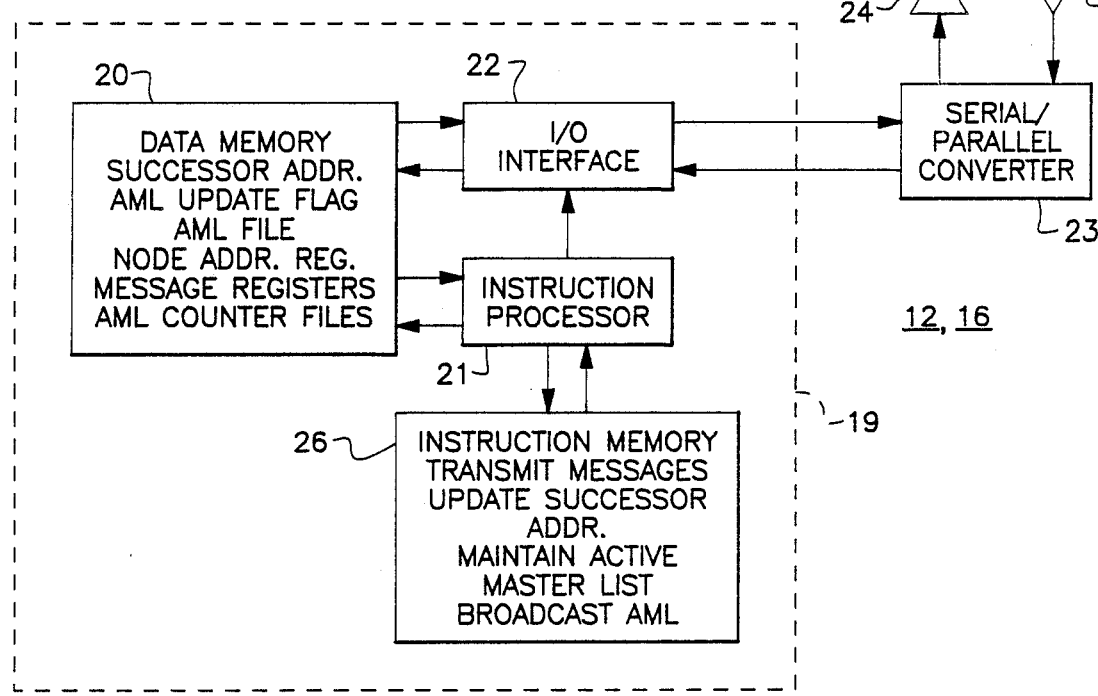
Fig. 2
| PREAMBLE | MESSAGE TYPE | DEST ADDR. | SOURCE ADDR. | EXT. TYPE | DATA | CHECKSUM | ACTIVE MASTER MESSAGE |
| PREAMBLE | STATUS FIELD | SOURCE ADDR. | EXT. TYPE | DATA | CHECKSUM | RESPONSE TO ACTIVE MASTER |
Fig. 3

— 4,949,337 —

TOKEN PASSING COMMUNICATION NETWORK INCLUDING A NODE WHICH MAINTAINS AND TRANSMITS A LIST SPECIFYING THE ORDER IN WHICH THE TOKEN IS PASSED

BACKGROUND

It is useful in certain types of systems comprising a number of separated component devices or units, and which system may have a variety of different configurations, to be able to control thesv individual components via a network, where each component of the system has assigned to it a station or node which has the capability of communicating with the other stations or nodes in the network. This allows coordination of the operation of individual components of the system so as to allow them to function cheaply and effectively as a system. The individual components might be intended to perform functions in a manufacturing process or, in the actual case for which the system to be described was intended, a heating, ventilating, and air conditioning system intended for commercial and manufacturing buildings.

To accommodate such systems having a multitude of different configurations, it is preferable that the network which controls it have the ability to be flexibly configured Furthermore, such systems may well be reconfigured on occasion, and it is highly advantageous to be able to easily conform the control network to the configuration of the system at the same time. It is also desirable that failure of individual nodes of the network will not bring the entire system to a halt. Lastly, it is desirable to be able to connect the individual nodes of the control network to each other for information exchange among them through a single conductor with ground return, or through a pair of conductors. This last requirement dictates serial communication.

There have been available for some time networks which are capable of functioning in this manner. In one type, a particular node serves as a master and mediates communication among itself and the other nodes on a data bus. There are also types involving a number of master nodes of roughly equivalent capabilities which can communicate with each other on the data bus. Among these latter systems, one successful embodiment involves the use of a token which is passed from one master node in the network to the next, possession of the token being necessary for a node to transmit on the data bus. Since only serial communication occurs, it is necessary that only a single node be transmitting at any given time to prevent interference between concurrent messages.

To control or specify which node can transmit on the data bus at any given time, the use of the token, or more properly a token message, allows individual master nodes to designate the next node which is permitted to transmit, by providing it with the token message. To accomplish this, each master node must have a unique network address by which the token message is directed to the desired node. If a particular node has no message when receiving the token message which it wishes to transmit, then it merely passes the token message on to the next designated node. In this way, if every master node has some other master node which transmits a token to it, then each node is assured of eventually having an opportunity to transmit signals on the data bus.

A token message has a preselected unique format which includes first a token passing code which identifies a message as a token message and second a successor address which is the network address of the node to which the token message is directed, and which is to become next active. The transmission of a token message signals that the master node transmitting the token message is attempting to terminate its active status. Each master node must include a successor address register in which the successor address is stored.

In those networks which include a single master node and a number of slave nodes, the master node stores an address list which specifies the order in which the individual slave nodes shall receive the token. In this type of network, the master node must receive control of the network as each of the other nodes completes its activities.

Each of these schemes lacks some capabilities that are desirable in terms of network flexibility and reliability. For example, in the master-slave type of network, if the master node fails for any reason, the entire network fails with it. In the multimaster token passing network, it is difficult to alter the rigid order in which the nodes are allowed to transmit on the line, meaning that a significant amount of time can elapse between occurrence of an event requiring immediate attention and when the particular node again receives the token and is thus allowed to transmit. In certain circumstances, it may be necessary for the node to have the token and the opportunity to transmit more frequently than this, meaning that the network cannot function as efficiently and effectively with the physical system as is desirable.

There are a number of network designs which solve one or another of these problems. For example, in U.S. Pat. No. 4,566,097, the network hardware disclosed allows nodes with higher priority messages to take precedence over those with lower priority messages by transmitting a command causing the nodes or stations with lower priority messages to abort the transmission. U.S. Pat. No. 4,491,946 discloses a token passing network which has a predetermined rigid order in which the token is passed from one node to the other, but does allow for easy addition of nodes to or deletion of nodes from the network. Other U.S. patents which include token passing abilities of nodes within a communications network are Nos. 4,663,748; 4,674,086; 4,566,097; and 4,511,958.

Another problem involves the procedure by which individual nodes are added to or deleted from the network. One procedure involves individual nodes detecting the presence of new nodes on the network by the expedient of each maintaining a counter which is cycled by one through all of the inactive network addresses greater than the individual node's own address and smaller than the successor address for the node involved. This approach has the advantage of simplicity, but if there are a relatively small number of nodes active in the network compared to its maximum allowable size, then it is possible that many cycles of the token are necessary before the network address of the new node is generate by incrementation, and it thus receives a token for the first time.

BRIEF DESCRIPTION OF THE INVENTION

Our solution to many of these problems is a system which has a number of master nodes which have the conventional capability of accepting and transmitting tokens. There is also one master node (the communication master) which maintains an active master list wherein the network address of each master node is maintained. Whenever for any reason it is necessary to reconfigure the order in which token messages are passed by all of the masters, then the communication master broadcasts an active master list in a message which has a unique identifying format, and which provides signals on the data bus which encode the active master list, essentially including the entire content of the active master list stored in the communication master node's address memory. Each of the master nodes other than the first includes means for receiving the active master list message on the data bus from the communication master node and which further includes means responsive to the presence of the master list message by sensing the presence of the unique identifying format and extracting from the master list the network address which succeeds the network address of the master node involved, and then also including means for storing the master node address so extracted in the successor address register of the master node involved.

For this scheme to work, it is necessary that newly added master nodes on the network be identified as such. One possible method is to provide a silent space in conjunction with transmission of a token message, or at the end of a complete cycle through the nodes. This has the disadvantage of wasting time in most cases and, if two nodes are added between two silent spaces, creating a collision as both nodes attempt to identify themselves to the communication master. Another approach involves issuing individual signals directed to every legal address in the network. This is effective but somewhat wasteful of time. The preferred solution involves binary search techniques for addressing nodes in a way which allows them to respond individually without individual inquiries directed to every legal address. Without going into details, suffice it to say that the communication master transmits a number of signals directed to different groups of the newly added nodes on the network. By detecting whether no, one, or colliding answer signals occur after several iterations, all newly added nodes may be isolated and their individual network addresses identified. Once the communication master has the addresses of the newly added master nodes, it can update the active master list by inserting the network address of the new master nodes into the active master list.

Accordingly, one purpose of this invention is to allow individual master nodes to be added and removed from a network without requiring external intervention to reset the network.

A second purpose is to allow each master node to quickly determine its successor master node on system start-up or restart.

Another purpose is to reduce the data bus traffic when updating the successor master nodes for the network.

Yet another purpose is to provide a measure of tolerance in dropping individual master nodes from the network.

BRIEF DESCRIPTION OF THE DRAWINGS

FIG. 1 is a block diagram of a typical communication network involving the invention herein described.

FIG. 2 is a general block diagram of an individual node of FIG. 1.

FIG. 3 shows the structure of the messages transmitted on the network of FIG. 1.

DETAILED DESCRIPTION OF THE PREFERRED EMBODIMENT

Figure 4:
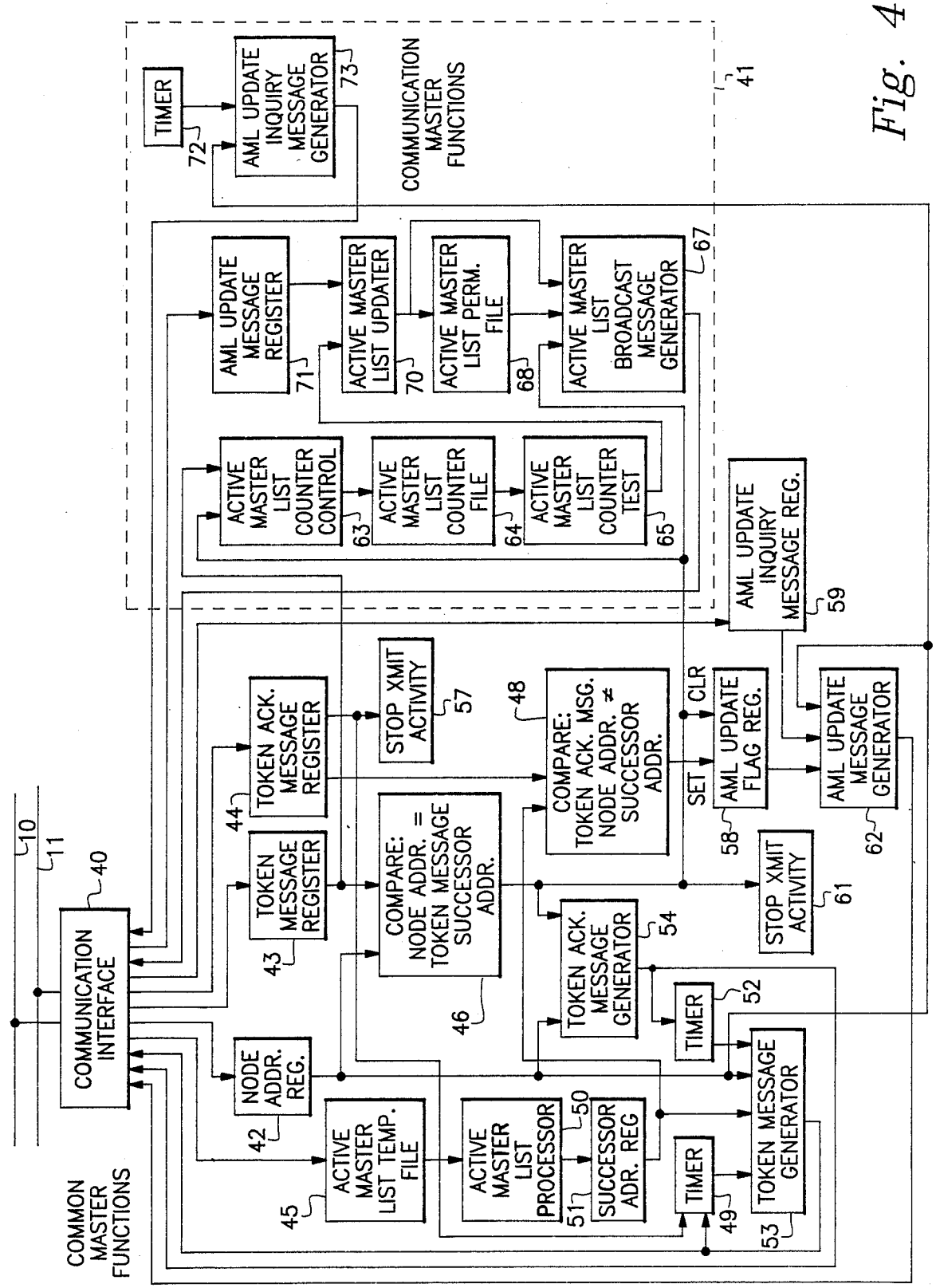
FIG. 4 is a detailed functional block diagram of the individual node of FIG. 2.

Referring first to FIG. 1, a data bus for communication is shown having a pair of conductors 10 and 11. These conductors typically carry differential signals where the waveforms of one conductor mirror the waveforms of the other. Conductors 10 and 11 preferably form a twisted pair, meaning that they are physically twisted so as to in general experience the same noise events. Because the signals are sensed by the individual nodes differentially, such noise in essence cancels itself out. It is possible to use a single conductor with a ground return to form the second conductor, but this is not preferred because of the lack of noise immunity. There are nodes 12-15 and one first or communication master node 16, all connected to the data bus.

FIG. 2 shows a typical node such as node 12 or 16 from FIG. 1 with the individual hardware blocks comprising it. A preferred embodiment of such a node includes a standard microprocessor 19 such as the Motorola 6803 having the various block functions shown. It should be understood that the physical realization of the invention is present in the instructions which are inserted into microprocessor 19 and which physically cause the various signals applied by an individual node to the data bus. These individual instructions are stored in an instruction memory 26 and, for the current invention, have the main functions indicated. Each of the master nodes is capable of transmitting messages and updating its own successor address. The communication master 16 (FIG. 1) in addition must update or maintain the active master list and also broadcast the active master list to the other master nodes 12, etc.

There is also an I/O interface 22 which typically forms a part of the microprocessor of which memory 20, instruction processor 21, and instruction memory 26 are all parts as well. I/O interface 22 mediates the transfer of data between data memory 20 and serial/parallel converter 23 under control of processor 21. Serial/parallel converter 23 converts the 8-bit byte information supplied by I/O interface 22 and converts information from interface 22 into serial data supplied to transmitter driver 24. Transmitter driver 24 creates the actual voltage waveforms on conductors 10 and 11 which transmit information to other nodes. Information is also received from conductors 10 and 11 by receiver amplifier 25 which supplies a signal to serial/parallel converter 23 which can be converted into the 8-bit bytes necessary to be accepted by I/O interface 22. I/O interface 22 then also causes the information from serial/parallel converter 23 to be stored in the proper locations of data memory 20 under control of instruction processor 21.

In FIG. 3, the structure of each message generated by any of the nodes is shown. There are the two formats shown. Each active master message is preceded by a preamble which signals the start of a message and includes a generalized description of the message to follow, and whose structure is of no further concern at the present time. The body of the message includes a MESSAGE TYPE segment immediately following the preamble which includes a sequence of bits which uniquely identify the purpose of the message and the type of response to be elicited from the node or nodes which respond to it. The DESTINATION ADDRESS and SOURCE ADDRESS segments respectively identify the node to which the message is directed and the node address of the transmitting node. The EXTENSION-TYPE segment further qualifies the message purpose and need not be of further concern. The DATA segment includes the body of the message and, depending on its purpose, may include any number of different packets of information. The CHECK SUM includes some kind of redundant information allowing the receiving node(s) to determine the accuracy of the message transmission and, in some cases, to correct the message if only a few errors are present. The responses generated to active master messages are similar to active master messages, except that no destination address is specified.

FIG. 4 is a functional block diagram of the part of each node which incorporates the invention. The functions enclosed in the dashed line box 41 are those functions which are unique to the communication master 16, the one of the various master nodes 12, etc. which stores the active master list and performs a number of functions related to maintaining and propagating it to the other master nodes. The communication interface 40 comprises the I/O interface 22, the serial-to-parallel converter 23, the transmitter driver 24, and receiver amplifier 25, as shown in FIG. 2. The communication interface 40 includes a multiplexer which selects the individual inputs and outputs as they occur. As a practical matter, the function of this multiplexer is performed by instructions from the instruction memory 26 executed by instruction processor 21.

It is convenient to start this description with the common master functions which interact with those of the communication master functions in box 41. These common master functions are processing of token messages, token acknowledge messages, active master list broadcast messages, and active master list update inquiry messages transmitted by other nodes; generating token, token acknowledge and active master list update messages; and clearing the active master list update flag. It should be understood that each function represented in FIG. 4 is physically performed by some part of the microprocessor included in each node, and under the mediation and control of instructions in instruction memory 26. Typically, the various registers indicated may physically comprise any of the various data memory 20 locations. There are typically timing considerations which must be observed in order for the functions identified to accomplish the desired and stated purposes. In general, these timing considerations are implicit in the discussion. There will also be explicit timing conditions stated for most of the various timing and sequence requirements involved.

There is a node address register 42 which receives from the communication interface 40 the actual numeric network address assigned to the master node of which the particular node address register 42 forms a part. The contents of the node address register 42 is set by the user of the network prior to or just after the node itself is attached to the data bus 10 and 11. The node address stored in register 42 can in this network be changed only by human intervention.

There are token messages which are transmitted on the data bus for the purpose of designating another node 12, etc. as active. Each token message is in each node (except for the node which transmitted it) directed to the token message register 43 by the communication interface 40. The communication interface 40 identifies token messages by their unique identifying format which is a unique pattern of bits in the MESSAGE TYPE segment (see FIG. 3), in directing the token messages to register 43. In each token message, the DESTINATION ADDRESS segment contains a successor address which is the address of the next node 12, etc. which is to become active. Comparison element 46 receives the contents of node address register 42 and the successor address stored in the DESTINATION ADDRESS segment of the token message in register 43. Equality between these two addresses is the condition which permits the master node, to which the equal node address is assigned, to become active as indicated by the start transmit activity block 61. The master nodes for which the comparison fails remain inactive or quiescent.

There are a number of other activities which occur upon a successful comparison performed by element 46. These include issuing a token acknowledge message and clearing the active master list update flag. Both of these activities will be explained later so as to more logically structure this discussion. There is also an active master list function which is activated by this comparison, and this will be discussed as a part of the explanation of the communication master 16.

Before a master node can become active by the event of a token message directed to it, it is necessary for it to have its network address as the successor address for another node, or rarely, for its address to be generated when a token message addressed to another node is for one reason or another not acknowledged. One way this is accomplished is when the node's network address is entered into an active master list which is permanently stored in the one node 16 (FIG. 1) of the nodes which functions as the communication master. In FIG. 4, the active master list permanent file is shown as a part of the communication master functions subsystem 41. While there are a number of ways in which an active master list may be arranged, what we prefer is to simply list all of the master nodes which are to be made active in the sequence in which they are to become active. For this scheme, a network address N in the active master list is immediately followed by the network address of the node to which the token message is sent by the node having network address N. This arrangement of the active master list will be presumed hereafter.

The processing within individual master nodes 12, etc. associated with the active master list functions is a logical next subject. It is sufficient for the present discussion for the reader to realize that on occasion active master list messages are broadcast in their entirety on the data bus by communication master 16 and are received on conductors 10 and 11 by each of the communication interfaces 40. The active master list broadcast message generator 67 includes a unique identifying format in the MESSAGE-TYPE segment of the active master list message, and this conditions the communication interface 40 of each master node 12, etc. to cause the active master list to be temporarily stored in a file established for that purpose represented by functional block 45. In this preferred embodiment, the data memory 20 serves the function of file 45. It is entirely possible that only two of the addresses contained in the active master list message will be stored at any given instance in file 45. It is only necessary that, during transmission of the active master list message, this file receives and stores the network address for the master node of which it is a part as well as the network address associated with it as the successor address to be placed in the DESTINATION ADDRESS segment of token messages transmitted by the master node 13, etc. involved. The active master list processor 50 receives the active master list from the file 45 and extracts this network address of the master node which is to be stored in the token message provided by this master node. This so-called successor address is then stored in successor address register 51 by the active master list processor 50.

The token message generator element or function 53 formats the token messages generated by the particular master node involved and which function as the token message stored by other master nodes in their own token message registers 43. In addition to its unique identifying characteristic, token message generator 53 includes in the DESTINATION ADDRESS segment of token messages the contents of successor address register 51 and as the SOURCE ADDRESS segment the contents of node address register 42. In the communication protocol involved here, there are specific time limits imposed on the interval which a master node may remain active. This time interval is contained in timer element 52 and is set to the predetermined value upon transmission of a token acknowledge message by the token acknowledge message generator 54. In our preferred embodiment, this time is set to less than or equal to one second. After the time interval to which timer 52 was set has elapsed, then the token message generator 53 is enabled to send a token message to communication interface 40 and placed by it on the data bus. Since in general only the master node which is active can transmit on the data bus, there should be no "collision" of a token message with other messages under normal circumstances. There are provisions for dealing with collisions in controlled situations, and these will be touched on briefly in discussion below.

The token acknowledge message mentioned above in connection with comparison element 46 is issued by generator element 54 responsive to a token message directed to that master node 12, etc. of which comparison element 46 is a part. The token acknowledge message is the first transmission of a node upon becoming active responsive to a token message. These token acknowledge messages have a unique identifying format incorporated in their MESSAGE TYPE segment which distinguishes them from every other type of message. The generation of a token acknowledge message by generator 54 is prompted by a successful comparison of the node address to the token message successor address by comparison element 46. The token acknowledge message includes the contents of node address register 42 in the SOURCE ADDRESS segment of the message. The token acknowledge message is transmitted by a node as a slave. It will not take over as the active master until it makes sure the sending master heard the token acknowledge message correctly. The absence of any messages for an allowed retry time is the indication that the sending master heard the token acknowledge. Once the retry time has expired, it will enable transmit activity 61. The token message from generator 53 is the last message transmitted by a master node 12, etc. during an active episode before it becomes inactive.

The token acknowledge message transmitted on the data bus is received by the master which sent the token message and causes it to be stored in the master's token acknowledge message register 44. The token acknowledge message register 44 of the master node then contains as a part of the token acknowledge message, the network address stored in register 42 of whichever master node 12, etc. transmitted the particular token acknowledge message. This network address is transmitted to comparison element 48 where it is compared to the contents of the successor address register 51. The output path of comparison element 48 carries a signal if inequality is detected. Inequality here indicates that basically a master node, other than that next in line for activity after the current master node ceases its activity as specified by the active master list, has actually accepted the token message. In this case, the new master flag register 58 is set to indicate this condition. When an active master list (AML) update inquiry message is sent at a later time, the set AML update flag enables the transmission of the AML update message in response. Regardless, mere presence of a token acknowledge message indicates passing of the token to some successor master node, requiring the node to become inactive as indicated by the stop transmit activity element 57.

It is also possible that rarely a token message which is transmitted will not be answered by the expected token acknowledge message. Most often when this occurs, there simply will be no token acknowledge message provided. For this case, transmission of the token message from generator 53 is used to activate a timer 49. Timer 49 is designed such that it provides an input to token message generator 53, prompting generation of another token message, after sufficient time has elapsed to assure that a node will not respond to a token message with a token acknowledge message. In this case, token message generator 53 will usually use the next address listed in the AML to select the next node to send the token message. If the AML is not stored, then the master will have to employ a sequential search for a master that will accept the token. When a token acknowledge message, correct or otherwise, does occur, a signal is transmitted to timer 49 from register 48 which disables timer 49 and prevents timer 49 from enabling further generation of token messages by generator element 53.

One of the key aspects of this invention is its procedure for allowing simple and efficient adding and removing of individual master nodes from the network. One element which aids in this activity is the active master list (AML) update flag register 58. The AML update flag register 58 contains an AML update flag which is designed to be in a set condition upon powering up the particular master node involved. It remains set until a signal is applied to the clear input of register 58 clearing the AML update flag. The clear signal to register 58 is a result of a successful comparison by comparison element 46.

Each node also has the ability to process another type of message having a unique identifying format in its MESSAGE TYPE segment, and this is the AML update inquiry message. These messages are transmitted responsive to a command from an element of the communication master 16 while the communication master has the token and is active, and received by every other master node's communication interface 40 and directed to that node's AML update inquiry message register 59. Each AML update inquiry message includes in its SOURCE ADDRESS segment the network address of the communication master 16 which transmitted it. Upon the node's receiving each AML update inquiry message, the AML update message generator element 62 provides an AML update message which incorporates, as its DESTINATION ADDRESS segment the source address stored in AML update inquiry message register 59. However, the AML update message generator 62 does not cause an AML update message to be transmitted by communication interface 40 unless the AML update flag in register 58 is set, i.e. has its original state upon power up, or has been set when an improper token acknowledge message has been received.

It is possible that more than one master node may activate its AML update message generator 62 at the same time, and the resulting collision of messages must be resolved by the communication master functions shown in box 41. Collision resolution is beyond the scope of this invention, but it is important to understand that it is possible to resolve these collisions in such a way that each master node may eventually transmit its AML update message without causing a collision. This was also mentioned above. This concludes the discussion of the common master node functions.

For a complete understanding of this invention, it is important to also understand the special functions of the communication master 16 enclosed in box 41 and the interrelationship between the common master node and communication master node functions. There are two main categories of communication master functions which relate to this invention, as mentioned earlier in conjunction with the discussion of instruction memory element 26 in FIG. 2. These are the AML broadcast and the AML update functions.

The communication master 16 is bound by the same protocol as is each of the other master nodes 12, 13, etc. This means that it can transmit on the data bus only when it has had a token message directed to it by another master node. The special case of specifying the first active node upon powering the network up is not of concern here. Periodically under control of timer 72 when the communication master node 16 has become active, it transmits an AML update inquiry message as indicated by generator element 73. Again, each AML update inquiry message has a unique identifying format which in the MESSAGE TYPE segment identifies it as such a message and includes in its SOURCE ADDRESS segment the contents of its own node address register 42. Generator element 73 can set the DESTINATION ADDRESS segment of the master inquiry messages to direct them to one or a group of master nodes whose node address register(s) 42 are specified thereby. Each AML update inquiry message is received, as explained earlier, by the AML update inquiry register 59 in other nodes of the network, and the activities described in connection therewith are performed if the node which receives the AML update inquiry message has a value in its node address register 42 among those specified by the destination address in register 59.

If a distinguishable AML update message is provided on the data bus to the communication interface 40 in response to an AML update inquiry message, it is directed to the AML update message register 71. The presence of an AML update message indicates that either a new master node has been physically added to the network and must have token messages directed to it, or there is a network malfunction and hence must have its address (re)inserted in the AML. Accordingly, the AML updater element 70 receives the address value in the SOURCE ADDRESS segment in the AML update message register 71, for this address is the node address of the master node 12, etc. which transmitted the AML update message. Updater element 70 insets this address into the AML permanent file 68. There is also the related function of removing a node from the AML, and this will be described shortly hereafter.

A key aspect of this invention already mentioned involves the means within the individual master nodes 12, etc. for storing the correct address in the successor address register 51. One element of this function is accomplished by the AML broadcast generator 67, which broadcasts the entire AML in an AML message to every one of the master nodes in the system every time a change in the AML occurs. There was earlier discussion involving the AML temporary file 45 and the AML processor 50 which provides the signal encoding the correct address for storage by the successor address register 51. The AML broadcast generator element 67 in the master node functioning as the communication master is the source for the AML message which is stored by the temporary file 45 in each of the master nodes 12, etc.

The other of the master list update functions (mentioned above) is that of deleting individual network addresses from the AML permanent file element 68. An individual node might fail to respond to a token message directed to it for a number of reasons, such as power failure, node malfunction, removal, conductor 10 or 11 breaking, etc. The discussion relating to timer 49 and its interacting with generator element 53 is pertinent here, too. The general approach is to have some tolerance, and not drop a network address and its associated master node from the AML until there have been several successive instances where it has not responded to a token message having its node address in the DESTINATION ADDRESS segment of that token message. Accordingly, there is provided in communication master 16 an AML counter control 63 which receives the contents of its token message register 43 and the comparison signal from comparison element 46. Counter control 63 is directly coupled with an AML counter file 64 which is stored as a part of data memory 20, see FIG. 2. Each AML entry has a counter in counter file 64 dedicated exclusively to it. The procedure is as follows: Each comparison signal from element 46 indicating that the communication master node 16 is active is received by counter control 63 and functions as a counter decrement signal prompting control 63 to decrement all the counters in the counter file 64 associated with active master nodes. If the contents of any counter in counter file 64 reaches a preselected value, for example zero, due to decrementing by counter control 63, then counter test element 65 provides the identity of that master node, i.e. transmits its node address in an absent master signal to the AML updater 70. The AML updater 70 then deletes the node address from the AML permanent file 68. As explained earlier, each time the AML permanent file 68 is changed by updater 70, AML broadcast generator 67 is prompted by an update signal from updater 70 to transmit an AML broadcast message the next time the communication master 16 becomes active. This allows each of the master nodes in the network to update its successor address register 51 in a manner analogous to that for addition of a master node to the AML. It is recognized that in most cases only a few, perhaps only one, of the successor address registers 51 in the various master nodes in the network need be updated. However, since this is a relatively unusual event after a system has been properly installed and placed in use, the amount of time which the procedure consumes is insignificant.

There is yet another function of the AML counter control 63 which is applied for individual ones of the master nodes and their entries in the AML counter file 64. Each time a token message is received in register 43, the source address therein is extracted by counter control 63, and the counter in counter file 64 associated with that address in the AML entry is reset to a preselected value. A value which we prefer is 4, but any number from 1 to perhaps 10 are possible candidates. Any time a token message is transmitted by a master node, the implication is that that master node was active. If that master node was active, then its network address should be retained in the AML. It is only when no token message has been generated by a particular master node for a number of complete cycles of token message through the network that a master node should be deleted from the AML stored in permanent file element 68.

It can thus be seen that individual master nodes can be easily removed or dropped from the network without affecting the proper operation of any other nodes in the network. If the individual master nodes in a network are widely dispersed among various units to be controlled in an overall system, for example, an HVAC system, it is, for example, likely that many different circuit breakers will be involved in supplying power to the various master nodes. If one or a few nodes should cease operation, this network will still function at reduced capacity. The reliability and convenience of the control and communications network would be substantially impacted if the entire system fails whenever an individual master node in the network fails.

The embodiments of the invention in which an exclusive property or right is claimed are defined as follows:

1. In a communications network comprising a plurality of master nodes all connected to a single data bus comprising a pair of electrical conductors and each node including a node address register whose contents are a node address preassigned to the node, each of the nodes of the type having an active mode during which the node may provide on the data bus a plurality of different messages comprising electrical signals for communicating with the other nodes, and each of said nodes including a successor address register dedicated to storing a network address different from the content of the node address register, said active mode of a node being initiated responsive to receiving on the data bus signals encoding a token message having a preselected unique identifying format and including a successor address equal to the contents of the node address register of the node, and each said node further transmitting a token message including a successor address comprising the address stored in the successor address register of the node and terminating the active mode responsive to the receipt on the data bus of a token acknowledge signal having a preselected unique identifying format, and wherein a first of the master nodes includes an address memory in which may be stored an active master list including the contents of the node address registers of active master nodes in the network and further, specifying a successor address for each of the node addresses included in the active master list, the improvement comprising (a) in the first of the master nodes, an active master list broadcast means for providing signals on the data bus encoding therein an active master list message having a preselected unique identifying format and including at least a part of the active master list stored in the address memory; and (b) in each of the master nodes, means for receiving the active master list message on the data bus from the first of the master nodes, means responsive to the active master list message identifying format for extracting therefrom the successor address specified in the active master list for the network address of the master node involved, and means for storing the network address so extracted in the successor address register of the master node involved.

2. The network of claim 1, wherein the first of the master nodes includes:

(a) active master list counter file means storing a counter associated with each entry in the active master list, for decrementing the counters responsive to a counter decrement signal and issuing an absent master signal responsive to a counter achieving a preselected value, said absent master signal encoding the address of the master node with which is associated the counter achieving the preselected value;

(b) means for issuing a counter decrement signal; and (c) active master list update means receiving the absent master signal, for removing from the active master list the node address which equals the node address encoded in the absent master signal.

3. The network of claim 2, wherein the active master list broadcast means is responsive to an update signal, and wherein the active master list update means includes means for issuing an update signal to the active master list broadcast means responsive to the absent master signal.

4. The network of claim 2 wherein each node includes means for including in the token messages sent by it, the contents of its node address register, and wherein the active master list counter file means includes means receiving token message signals from the data bus, for setting the counter associated with the node address included in a token message to a preselected value.

5. The network of claim 2, wherein the counter decrement signal issuing means includes means receiving token messages from the data bus, for comparing the successor address encoded in the token message with the contents of the node address register in the first of the master nodes, and if equal issuing a counter decrement signal.

6. The network of claim 1, wherein each master node includes means for transmitting on the data bus responsive to an active master list update inquiry message, an active master list update message encoding the contents of the node address register of the master node transmitting the active master list update message, and wherein the first of the master nodes includes (a) active master list update means responsive to the active master list update messages for inserting those addresses encoded in the active master list update messages into the active master list; and (b) means for issuing active master list update inquiry messages at preselected times.

7. The network of claim 6, wherein the active master list broadcast means is responsive to an update signal, and wherein the active master update means includes means for issuing an update signal to the active master list broadcast means each time the active master list is updated.

8. The network of claim 6 wherein master nodes each further are of the type transmitting a token acknowledge message including the contents of the node address register of the node transmitting the token acknowledge message, said master nodes further including an active master list update flag register having set and cleared states and entering the cleared state responsive to the master node entering its active mode, wherein the active master list update message transmitting means transmits active master list update messages responsive to the active master list update flag register set state, and wherein each node includes means for setting the active master list update flag register responsive to inequality between the contents of the successor address register and the node address register contents transmitted in the token acknowledge message.

9. The network of claim 6 wherein master nodes each further are of the type transmitting a token acknowledge message including the contents of the node address register of the node transmitting the token acknowledge message, said master nodes further including an active master list update flag register having set and cleared states and entering the cleared state responsive to the master node entering its active mode and the set state upon powering up the node, wherein the active master list update message transmitting means transmits active master list update messages responsive to the active master list update flag register set state.

* * * * *